United States Patent
Liu et al.

(10) Patent No.: US 11,522,397 B2
(45) Date of Patent: Dec. 6, 2022

(54) MOTOR ROTOR AND PERMANENT MAGNET MOTOR

(71) Applicants: Gree Electric Appliances, Inc. of Zhuhai, Guangdong (CN); ZHUHAI KAIBANG MOTOR CO., LTD., Zhuhai (CN)

(72) Inventors: Na Liu, Guangdong (CN); Chengbao Zhong, Guangdong (CN); Feilong Chen, Guangdong (CN); Fang Xie, Guangdong (CN); Chuang Zhang, Guangdong (CN); Wende Yang, Guangdong (CN)

(73) Assignees: Zhuhai Kaibang Motor Co., Ltd., Zhuhai (CN); Gree Electric Appliances, Inc. of Zhuhai, Guangdong (CN)

( * ) Notice: Subject to any disclaimer, the term of this patent is extended or adjusted under 35 U.S.C. 154(b) by 140 days.

(21) Appl. No.: 17/053,450

(22) PCT Filed: Dec. 18, 2018

(86) PCT No.: PCT/CN2018/121816
§ 371 (c)(1),
(2) Date: Nov. 6, 2020

(87) PCT Pub. No.: WO2020/029506
PCT Pub. Date: Feb. 13, 2020

(65) Prior Publication Data
US 2021/0226493 A1    Jul. 22, 2021

(30) Foreign Application Priority Data

Aug. 9, 2018    (CN) .......................... 201810903354.5

(51) Int. Cl.
*H02K 1/27*      (2022.01)
*H02K 1/276*     (2022.01)
(Continued)

(52) U.S. Cl.
CPC .......... *H02K 1/2773* (2013.01); *H02K 1/185* (2013.01); *H02K 21/16* (2013.01); *H02K 2201/03* (2013.01); *H02K 2213/03* (2013.01)

(58) Field of Classification Search
None
See application file for complete search history.

(56) References Cited

U.S. PATENT DOCUMENTS 7,821,165 B2 * 10/2010 Yamane .................... H02K 3/18
                                                              310/179
2008/0224558 A1 * 9/2008 Ionel ..................... H02K 1/2766
                                                              310/156.57
(Continued)

FOREIGN PATENT DOCUMENTS

CN    102007669 A    4/2011
CN    102185397 A    9/2011
(Continued)

*Primary Examiner* — Thomas Truong
(74) *Attorney, Agent, or Firm* — The Webb Law Firm

(57) ABSTRACT

The present disclosure provides a motor rotor and a permanent magnet motor. The motor rotor includes a rotor body. In a section perpendicular to a central axis of the rotor body, a first slot side has a first and a second endpoint, and a second slot side has a third and a fourth endpoint. A distance from a connecting line between the first endpoint and the third endpoint to a center of the rotor body is denoted by h1, a radius of the rotor body is denoted by R, and h1 and R satisfy $0.96 \leq h1/R \leq 0.99$. A connecting line between the first endpoint and the center of the rotor body is a first connecting line, a connecting line between the third endpoint and the center of the rotor body is a second connecting line, and an (Continued)

included angle between the two connecting lines is denoted $\Phi$ and satisfies: $3.7° \leq \Phi \leq 5.6°$.

18 Claims, 8 Drawing Sheets

(51) Int. Cl.
    *H02K 1/18*     (2006.01)
    *H02K 21/16*    (2006.01)

(56) References Cited

U.S. PATENT DOCUMENTS

| | | | |
|---|---|---|---|
| 2013/0140922 A1 | 6/2013 | Yabe et al. | |
| 2015/0042200 A1 | 2/2015 | Yao et al. | |
| 2015/0102700 A1 | 4/2015 | Maeda | |

FOREIGN PATENT DOCUMENTS

| | | | | |
|---|---|---|---|---|
| CN | 103081300 A | | 5/2013 | |
| CN | 103138442 A | | 6/2013 | |
| CN | 104578490 A | | 4/2015 | |
| CN | 105743311 A | | 7/2016 | |
| CN | 106549521 A | * | 3/2017 | |
| CN | 106549521 A | | 3/2017 | |
| CN | 106787565 A | * | 5/2017 | |
| CN | 106787565 A | | 5/2017 | |
| CN | 206259766 U | | 6/2017 | |
| CN | 107222047 A | | 9/2017 | |
| CN | 107240975 A | | 10/2017 | |
| CN | 107516954 A | | 12/2017 | |
| CN | 207234637 U | | 4/2018 | |
| CN | 108039785 A | | 5/2018 | |
| CN | 108321953 A | | 7/2018 | |
| CN | 108321954 A | | 7/2018 | |
| CN | 108321955 A | | 7/2018 | |
| CN | 108736610 A | | 11/2018 | |
| CN | 208423983 U | | 1/2019 | |
| DE | 102010043224 A1 | * | 5/2012 | ............. H02K 1/276 |
| EP | 1482624 A1 | * | 12/2004 | ............. H02K 17/12 |
| EP | 1914863 A2 | * | 4/2008 | ............. H02K 1/246 |
| EP | 2722969 A1 | * | 4/2014 | ........... H02K 1/2773 |
| EP | 3667868 A1 | | 6/2020 | |
| EP | 3667869 A1 | | 6/2020 | |
| JP | 2002112480 A | | 4/2002 | |
| WO | WO-2015185847 A2 | * | 12/2015 | ............. F25B 31/02 |
| WO | WO-2018099811 A1 | * | 6/2018 | ............. H02K 1/274 |

* cited by examiner

ΜΟΤOR ROTOR AND PERMANENT MAGNET MOTOR

CROSS-REFERENCE TO RELATED APPLICATIONS

This application is the United States national phase of International Application No. PCT/CN2018/121816 filed Dec. 18, 2018, and claims priority to Chinese Patent Application No. 201810903354.5 filed Aug. 9, 2018, the disclosures of which are hereby incorporated by reference in their entirety.

BACKGROUND OF THE INVENTION

Field of Invention

The present disclosure relates to the field of motor technologies, and more particularly, to a motor rotor and a permanent magnet motor.

Description of Related Art

Referring to FIG. 1, each pole of a motor rotor with a permanent magnet tangentially embedded is provided with magnetic flux by two permanent magnets 1'. Compared with rotor motors in other forms, the power density of a motor using such a rotor may be higher. In order to pursue a higher power density, the thickness of the permanent magnet may be increased, and the thickness of the permanent magnet 1' is represented by W. However, increasing the thickness of the permanent magnet 1' may cause magnetic lines of force of the rotor to converge toward a magnetic pole center, as shown in FIG. 1 and FIG. 2.

SUMMARY OF THE INVENTION

According to an aspect of the present disclosure, a motor rotor is provided. The motor rotor includes a rotor body, which has a plurality of permanent magnet slots arranged along a circumferential direction and a polygonal slot located between two adjacent permanent magnet slots, the polygonal slot being symmetrical with respect to a magnetic pole centerline between the two adjacent permanent magnets, wherein the polygonal slot comprises: a first slot side, arranged at a first end of the polygonal slot along the circumferential direction of the rotor body, and having a first endpoint A away from a center of the rotor body and a second endpoint B adjacent to the center of the rotor body, in a section perpendicular to a central axis of the rotor body; and a second slot side, arranged at a second end of the polygonal slot along the circumferential direction of the rotor body, and having a third endpoint C away from the center of the rotor body and a fourth endpoint D adjacent to the center of the rotor body, in the section perpendicular to the central axis of the rotor body, wherein a distance from a connecting line between the first endpoint A and the third endpoint C to the center of the rotor body is denoted by h1, a radius of the rotor body is denoted by R, and h1 and the R satisfy: $0.96 \leq h1/R \leq 0.99$ and a connecting line between the first endpoint A and the center of the rotor body is a first connecting line, a connecting line between the third endpoint C and the center of the rotor body is a second connecting line, and an included angle $\Phi$ between the first connecting line and the second connecting line satisfies: $3.7° \leq \Phi \leq 5.6°$.

In some embodiments, a length h2 of a projection of the first slot side on the magnetic pole centerline and a length L1 of the connecting line between the first endpoint A and the third endpoint C satisfy: $0.05 \leq h2/L1 \leq 0.5$.

In some embodiments, a length L2 of a connecting line between the second endpoint B and the fourth endpoint D and the length L1 of the connecting line between the first endpoint A and the third endpoint C satisfy: $0.2 \leq L2/L1 \leq 1.0$.

According to an aspect of the present disclosure, a motor rotor is provided. The motor rotor includes a rotor body, which has a plurality of permanent magnet slots arranged along a circumferential direction and a polygonal slot located between two adjacent permanent magnet slots, the polygonal slot being symmetrical with respect to a magnetic pole centerline between the two adjacent permanent magnets, wherein the polygonal slot comprises: a first slot side, arranged at a first end of the polygonal slot along the circumferential direction of the rotor body, and having a first endpoint A away from a center of the rotor body and a second endpoint B adjacent to the center of the rotor body, in a section perpendicular to a central axis of the rotor body; and a second slot side, arranged at a second end of the polygonal slot along the circumferential direction of the rotor body, and having a third endpoint C away from the center of the rotor body and a fourth endpoint D adjacent to the center of the rotor body, in the section perpendicular to the central axis of the rotor body, wherein a distance from a connecting line between the first endpoint A and the third endpoint C to the center of the rotor body is denoted by h1, a radius of the rotor body is denoted by R, and h1 and the R satisfy: $0.96 \leq h1/R \leq 0.99$; a connecting line between the first endpoint A and the center of the rotor body is a first connecting line, a connecting line between the third endpoint C and the center of the rotor body is a second connecting line, and an included angle $\Phi$ between the first connecting line and the second connecting line satisfies: $3.7° \leq \Phi \leq 5.6°$; a length h2 of a projection of the first slot side on the magnetic pole centerline and a length L1 of the connecting line between the first endpoint A and the third endpoint C satisfy: $0.05 \leq h2/L1 \leq 0.5$; and a length L2 of a connecting line between the second endpoint B and the fourth endpoint D and the length L1 of the connecting line between the first endpoint A and the third endpoint C satisfy: $0.2 \leq L2/L1 \leq 1.0$.

In some embodiments, along a direction away from the center of the rotor body, a spacing between the first slot side and the second slot side is increasing.

In some embodiments, the first slot side and the second slot side are straight sides.

In some embodiments, the polygonal slot is a trapezoidal slot, the connecting line between the first endpoint A and the third endpoint C is a straight line, and the connecting line between the second endpoint B and the fourth endpoint D is a straight line.

In some embodiments, the first endpoint A and the third endpoint C are connected by a first polyline segment; and/or, the second endpoint B and the fourth endpoint D are connected by a second polyline segment.

In some embodiments, the polygonal slot is a hexagonal slot, the first polyline segment includes a first straight line segment and a second straight line segment, and a tip of a connection between the first straight line segment and the second straight line segment faces toward the center of the rotor body; and/or, the second polyline segment includes a third straight line segment and a fourth straight line segment, and a tip of a connection between the third straight line segment and the fourth straight line segment is away from the center of the rotor body.

In some embodiments, the first slot side and the second slot side are arc sides.

In some embodiments, the connecting line between the first endpoint A and the third endpoint C is a straight line, a polyline, or an arc line; and/or, the connecting line between the second endpoint B and the fourth endpoint D is a straight line, a polyline, or an arc line.

Another aspect of the present disclosure provides a permanent magnet motor including a motor rotor mentioned above.

In some embodiments, the permanent magnet motor further includes a stator assembly, the stator assembly includes a stator iron core, and an air gap is provided between the stator iron core and the rotor body.

In some embodiments, when an air-gap length a of the air gap is less than or equal to 0.4 mm and an outer diameter D of the rotor body is greater than or equal to 20 mm, a ratio of W to $\tau$ satisfies: $0.18 \leq W/\tau \leq 0.3$, wherein W represents a thickness of a permanent magnet, and $\tau$ represents a pole pitch of the motor.

In some embodiments, the ratio of W to $\tau$ satisfies: $0.19 \leq W/\tau \leq 0.23$.

In some embodiments, the stator assembly further includes a stator frame mounted on the stator iron core, and a stator winding is concentratedly wound around the stator frame.

In some embodiments, a three-phase voltage of the permanent magnet motor is a three-phase sine-wave voltage.

BRIEF DESCRIPTION OF THE DRAWINGS

The accompanying drawings constitute a part of this specification describe embodiments of the present disclosure, and together with the specification, serve to explain the principles of the present disclosure. The present disclosure can be understood more clearly with reference to the accompanying drawings based on the following detailed description, in which.

Figure 1:
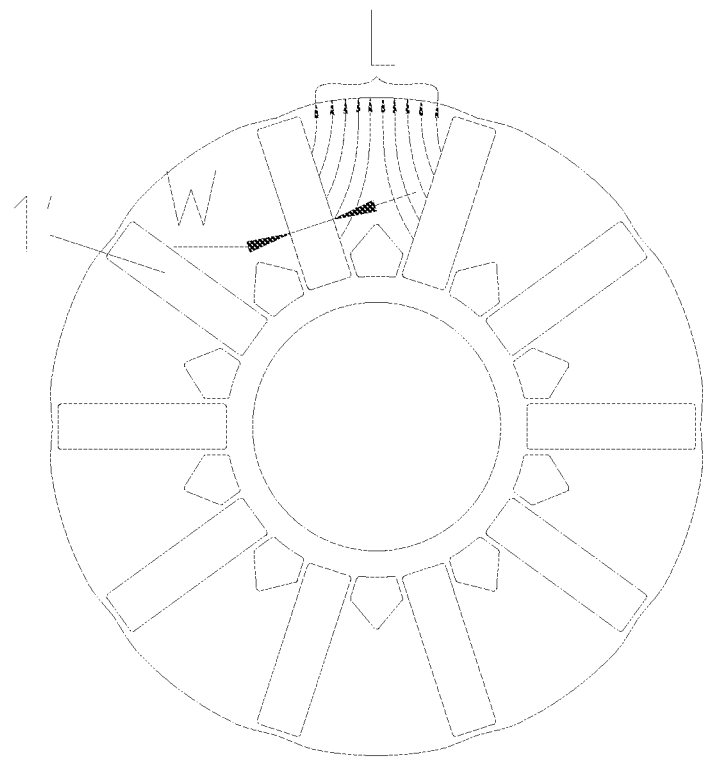
FIG. 1 is a schematic diagram showing distribution of magnetic lines of force for a motor rotor in the related technologies when a permanent magnet has a smaller thickness.
Figure 2:
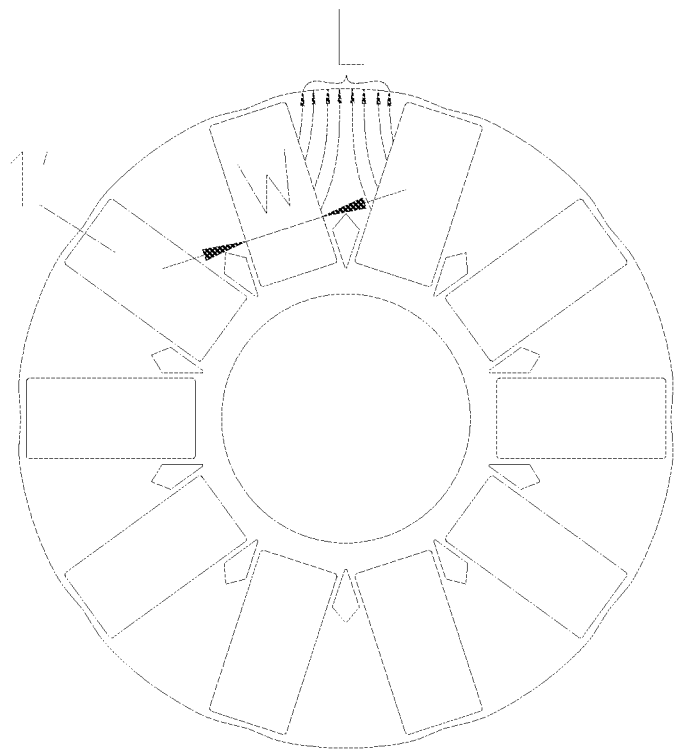
FIG. 2 is a schematic diagram showing distribution of magnetic lines of force for a motor rotor in the related technologies when a permanent magnet has a larger thickness.

Reference numerals in the accompanying drawings are denoted by:

rotor body 1; permanent magnet slot 2; polygonal slot 3; first slot side 4; second slot side 5; first straight line segment 6; second straight line segment 7; third straight line segment 8; fourth straight line segment 9; and stator iron core 10.

DETAILED DESCRIPTION OF THE INVENTION

Various exemplary embodiments of the present disclosure will now be described in detail with reference to the accompanying drawings. The description of the exemplary embodiments is merely illustrative, and in no way serves as any limitation on the present disclosure and application or use thereof. The present disclosure may be implemented in many different forms and should not be limited to the embodiments set forth herein. These embodiments are provided such that the present disclosure is thorough and complete, and the scope of the present disclosure is fully conveyed to those skilled in the art. It is to be noted that the relative arrangement, numerical expressions, and numerical values of the components and steps set forth in these embodiments should be construed as being merely exemplary and explanatory rather than restrictive, unless otherwise specifically stated.

The terms "first", "second" and so on used in the present disclosure do not denote any sequence, quantity or importance, but instead are merely intended to distinguish different constituent parts. Terms such as "include", "contain" or any other variants are intended to indicate that essentials prior to the terms contain essentials enumerated posterior to the terms, and do not exclude the case that other essentials are included. "On," "under," "right," "left" and the like are only used to indicate relative position relationship, and when the absolute position of the object which is described is changed, the relative position relationship may be changed accordingly.

In the present disclosure, when it is described that a particular device is located between the first device and the second device, there may be intervening devices between the particular device and the first device or the second device, or there may be no intervening devices. When it is described that a particular device is connected to other devices, the particular device may be directly connected to the other device without intervening devices or with intervening devices without being directly connected to the other devices.

Unless otherwise specifically defined, all terms (including technical terms and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Technologies, methods and equipment known to those of ordinary skill in the related art may not be discussed in detail, but where appropriate, the technologies, methods and equipment should be considered as part of the specification.

An arc length L of an outer circle of the rotor through which the magnetic lines of force pass gradually decreases with the increase of the thickness of the permanent magnet 1', which in turn affects an air-gap flux density distribution of the motor. The air-gap flux density distribution has a great effect on a detent torque of a motor, so how to increase the power density of the motor while reducing the detent torque of the motor is a problem that motor developers strive to solve.

On this account, embodiments of the present disclosure provide a motor rotor and a permanent magnet motor, which can increase a power density of the motor while reducing a detent torque of the motor to improve working performance of the motor.

Referring to FIGS. 3 through 16, according to some embodiments of the present disclosure, the motor rotor includes a rotor body 1. The rotor body 1 has a plurality of permanent magnet slots 2 arranged along a circumferential direction, and a polygonal slot 3 located between two adjacent permanent magnet slots 2. The polygonal slot 3 is symmetrical with respect to a magnetic pole centerline between the two adjacent permanent magnets. A polygonal contour of the polygonal slot 3 is not limited to a polygon formed by connecting straight line segments, and may also include a polygon formed by connecting arc line segments and a polygon formed by connecting the arc line segments and the straight line segments.

The polygonal slot 3 includes a first slot side 4 and a second slot side 5. The first slot side 4 is arranged at a first end of the polygonal slot 3 along the circumferential direction of the rotor body 1, and the second slot side 5 is arranged at a second end of the polygonal slot 3 along the circumferential direction of the rotor body 1. In a section perpendicular to a central axis of the rotor body 1, the first slot side 4 has a first endpoint A away from a center O of the rotor body 1 and a second endpoint B adjacent to the center O of the rotor body 1, and the second slot side 5 has a third endpoint C away from the center O of the rotor body 1 and a fourth endpoint D adjacent to the center O of the rotor body 1.

A distance from a connecting line between the first endpoint A and the third endpoint C to the center O of the rotor body 1 is denoted by h1, a radius of the rotor body 1 is denoted by R, and h1 and R satisfy: $0.96 \leq h1/R \leq 0.99$. A connecting line between the first endpoint A and the center O of the rotor body 1 is a first connecting line, a connecting line between the third endpoint C and the center O of the rotor body 1 is a second connecting line, and an included angle Φ between the first connecting line and the second connecting line satisfies: $3.7° \leq \Phi \leq 5.6°$. Based on such setting, the detent torque of the motor can be successfully reduced. In this way, a comprehensive consideration is given to the detent torque and an output torque to ensure better performance of the motor.

A length h2 of a projection of the first slot side 4 on the magnetic pole centerline and a length L1 of the connecting line between the first endpoint A and the third endpoint C satisfy: $0.05 \leq h2/L1 \leq 0.5$. A length L2 of a connecting line between the second endpoint B and the fourth endpoint D and the length L1 of the connecting line between the first endpoint A and the third endpoint C satisfy: $0.2 \leq L2/L1 \leq 1.0$. Based on such setting, sufficient output torque can be ensured while reducing the detent torque of the motor, such that the overall performance of the motor is optimal, ensuring the best structural strength of the motor.

By adding the above constraints, the structure of the motor rotor can be optimized, such that a power density of the motor is increased while the detent torque of the motor is efficiently reduced, thereby overcoming the problem of increased detent torque of the motor caused by increased thickness of a permanent magnet of a permanent magnet tangentially embedded rotor.

Figure 3:
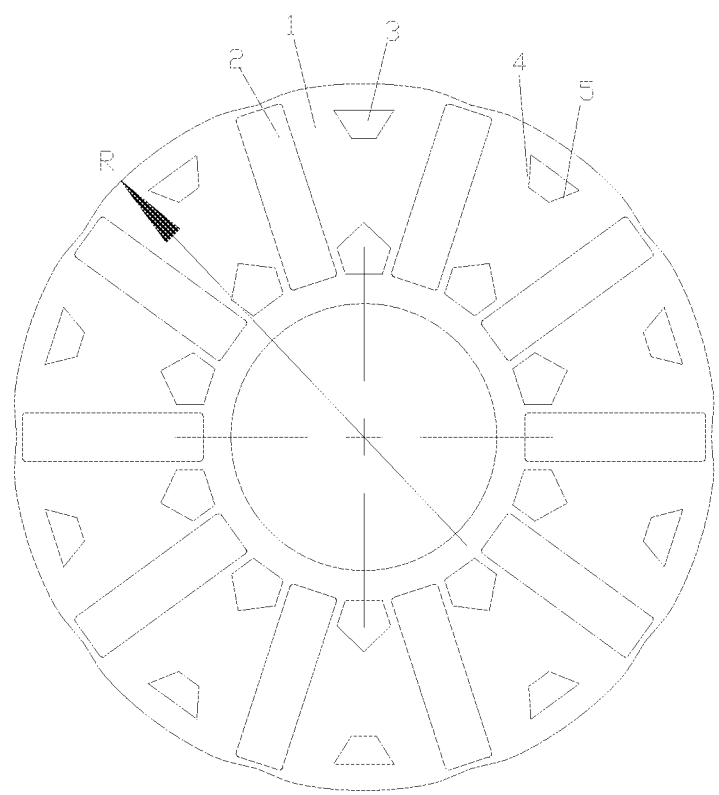
FIG. 3 is a schematic structural diagram of a motor rotor according to some embodiments of the present disclosure.

Referring to FIG. 3, in some embodiments, the rotor body 1 has ten permanent magnet slots 2, and the permanent magnet slots 2 are evenly distributed in the rotor body 1 in a radial form. In some embodiments, the permanent magnet may be first magnetized by way of external magnetization, and then is fixed into the permanent magnet slot 2 by glue. In some other embodiments, the permanent magnet also may be first fixed into the permanent magnet slot 2 by glue, and then is magnetized with the rotor as a whole. Surfaces of two adjacent permanent magnets facing each other have the same polarity to jointly provide a magnetomotive force of the pole, which greatly improves the power density of the permanent magnet motor, such that the permanent magnet motor can be miniaturized. In order to further increase the power density of the motor, the thickness W of the permanent magnet may be increased. In some embodiments, the permanent magnet is magnetic steel.

In some embodiments, along a radial direction away from the center of the rotor body 1, a spacing between the first slot side 4 and the second slot side 5 is increasing. Because it is along the radial direction of the rotor body 1, the farther away from the center of the rotor body 1, the greater the spacing between the two permanent magnets becomes. Also, the circumferential width of the polygonal slot 3 increases accordingly, such that the structure of the polygonal slot 3 can correspondingly change with the spacing between the permanent magnets. In this way, magnetic lines of force in a magnetic pole center can be more effectively dispersed, and thus the detent torque is optimized.

Figure 4:
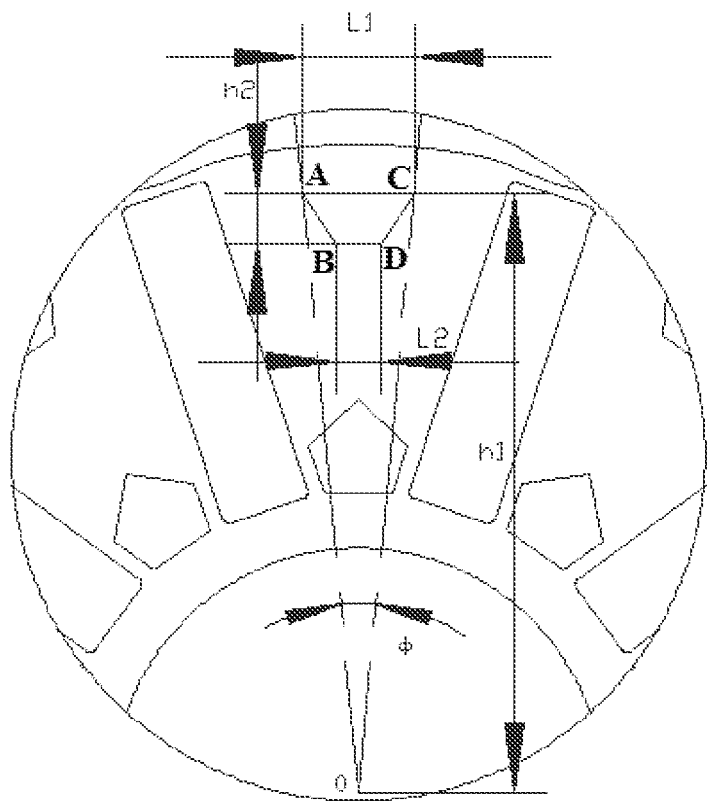
FIG. 4 is a schematic diagram showing a size of a polygonal slot according to the embodiments in FIG. 3.

Referring to FIG. 3 and FIG. 4, in some embodiments, the polygonal slot 3 is a quadrilateral slot, and the first slot side 4 and the second slot side 5 are straight sides. In FIG. 3, the polygonal slot 3 is a trapezoidal slot, the connecting line between the first endpoint A and the third endpoint C is a straight line, and the connecting line between the second endpoint B and the fourth endpoint D is a straight line.

Taking a size relationship between the polygonal slot 3 and the rotor body 1 as shown in FIG. 4 as an example, for motors of different sizes, the h1/R may represent the position of an upper side of the quadrilateral slot, and the Φ may represent the length of the upper side of the quadrilateral slot. Due to the limitation of a punching process, the distance from the upper side of the quadrilateral slot to the periphery of the rotor body 1 cannot be too small, therefore the h1/R cannot be designed to exceed the value of 0.99. The position and the length of the upper side of the quadrilateral slot are key factors affecting the distribution of the magnetic lines of force. In the following, effects of different h1/R and Φ values on the detent torque and the output torque of the motor are calculated, and results are as shown in FIG. 7 and FIG. 8.

Figure 7:
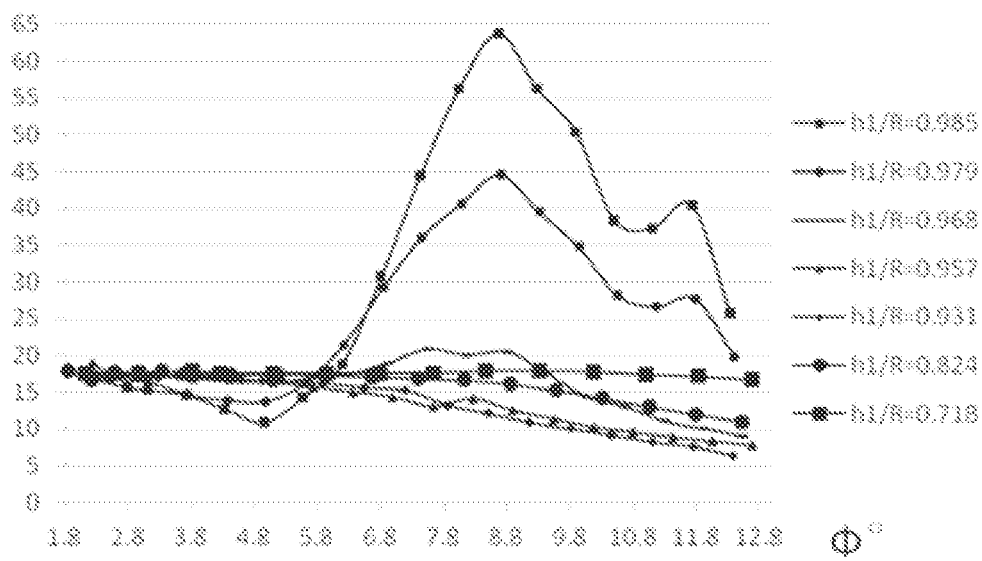
FIG. 7 illustrates a curve diagram between h1/R, $\Phi$ and a detent torque of the motor rotor according to some embodiments of the present disclosure.
Figure 8:
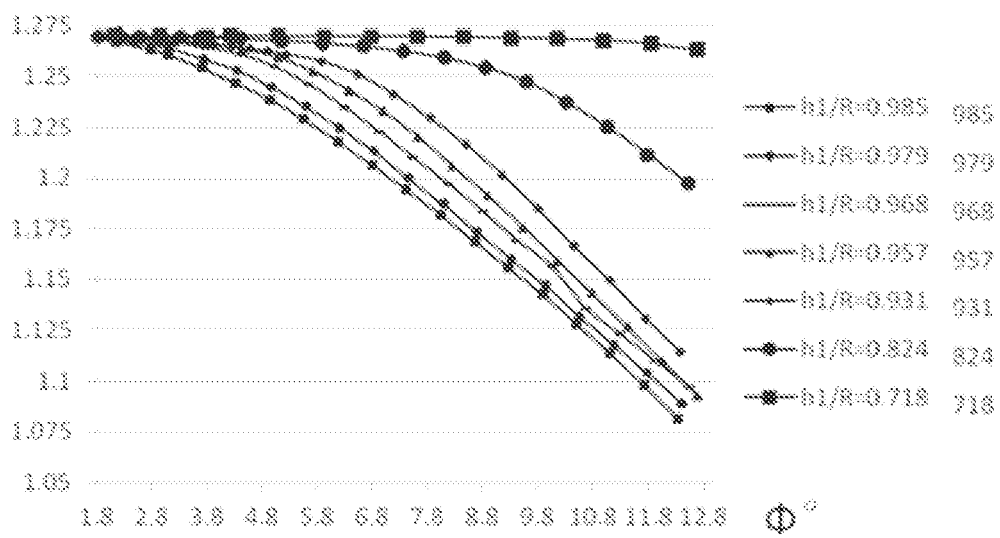
FIG. 8 illustrates a curve diagram between h1/R, $\Phi$ and an output torque of the motor rotor according to some embodiments of the present disclosure.

When the h1/R<0.96, as can be seen from data in FIG. 7, as the Φ increases, the detent torque gradually decreases. However, as can be seen from data in FIG. 8, the output torque gradually decreases as the Φ increases, and the output torque is greatly weakened while the detent torque is smaller. Therefore, when the h1/R is less than 0.96, the overall performance of the motor is poor.

When 0.96≤h1/R≤0.99, as can be seen from data in FIG. 7, the detent torque first decreases, then increases and then decreases again with the increase of the Φ. The minimum of the detent torque appears when 3.7°≤Φ≤5.6°, and at this moment the detent torque is successfully reduced. As can be seen from data in FIG. 8, the output torque is still larger because the Φ is smaller at this moment. Based on the above analysis, the detent torque and the output torque are synthetically considered, and it is found that the motor has the best performance when 0.96≤h1/R≤0.99 and 3.7°≤Φ≤5.6°.

The h2/L1 can represent a height of the quadrilateral slot. The height of the quadrilateral slot is a key factor affecting the distribution of the magnetic lines of force of the rotor. In the following, effects of different h2/L1 values on the detent torque and the output torque of the motor are calculated. The relationship between the h2/L1 and the detent torque is as shown in FIG. 9, and the relationship between the h2/L1 and the output torque is as shown in FIG. 10.

Figure 9:
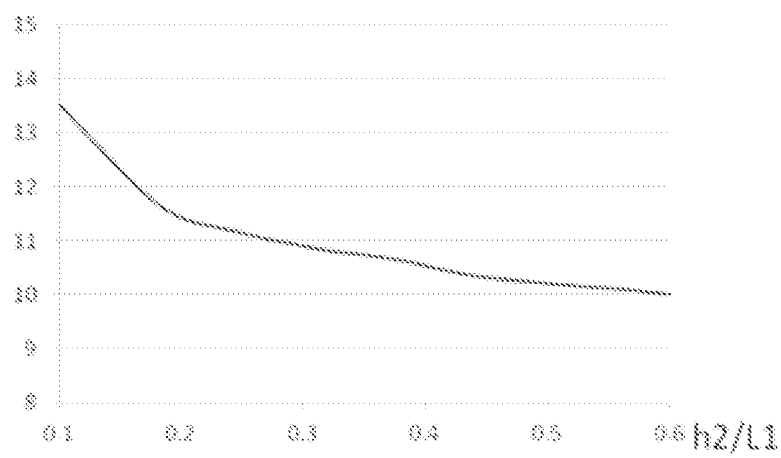
FIG. 9 illustrates a curve diagram between h2/L1 and the detent torque of the motor rotor according to some embodiments of the present disclosure.
Figure 10:
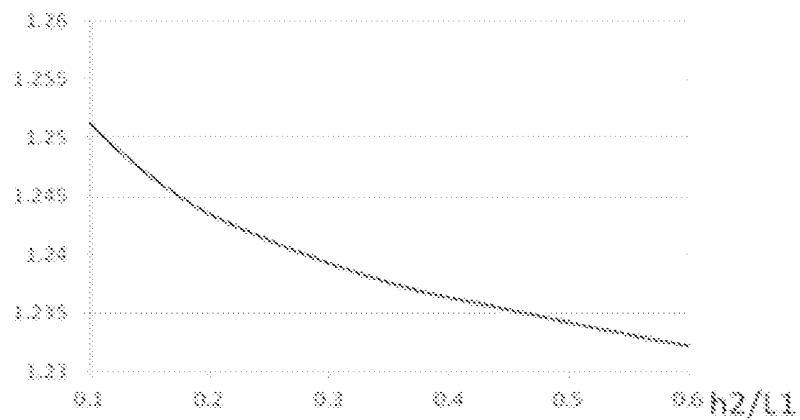
FIG. 10 illustrates a curve diagram between h2/L1 and the output torque of the motor rotor according to some embodiments of the present disclosure.

It is concluded from FIG. 9 and FIG. 10 that as the h2/L1 increases, that both the detent torque and the output torque gradually decrease. A certain value of the output torque needs to be ensured in the case of reducing the detent torque. As can be seen from the calculation results, the overall performance of the motor is the best when 0.05≤h2/L1≤0.5.

Figure 11:
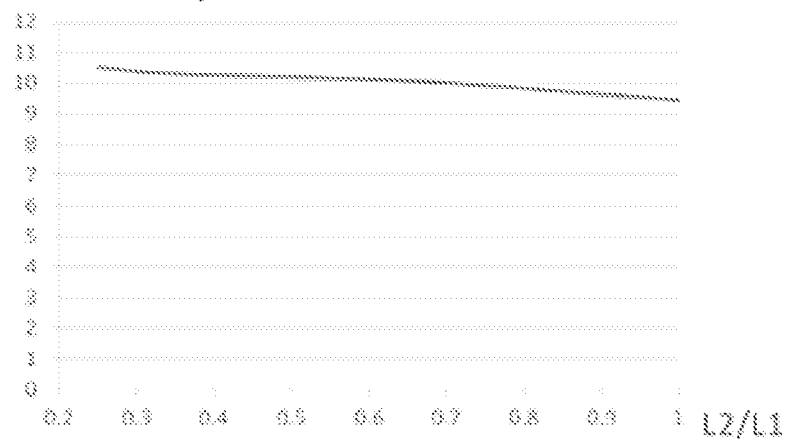
FIG. 11 illustrates a curve diagram between L2/L1 and the detent torque of the motor rotor according to some embodiments of the present disclosure.
Figure 12:
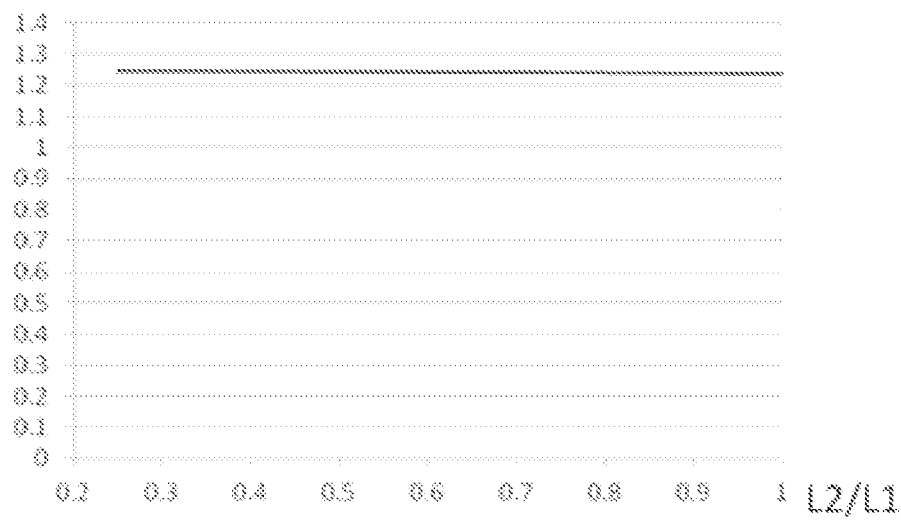
FIG. 12 illustrates a curve diagram between L2/L1 and the output torque of the motor rotor according to some embodiments of the present disclosure.

The L2/L1 represents a ratio of a lower side to an upper side of the quadrilateral slot. A calculation relationship between the L2/L1 and the detent torque is as shown in FIG. 11, and a calculation relationship between the L2/L1 and the output torque is as shown in FIG. 12. Based on the analysis of the calculation results, it is concluded that the value of L2/L1 has little effect on the performance of the motor. However, in order to prevent stress concentration when stamping an electromagnetic steel plate, the value of L2/L1 should not be too small. When 0.2≤L2/L1≤1.0, the motor rotor has the best overall performance and structural strength.

Therefore, by adding the above restriction, the structure of the motor rotor can be optimized, such that the power density of the motor is increased while the detent torque of the motor is efficiently reduced, thereby overcoming the problem of increased detent torque of the motor caused by increased thickness of a permanent magnet tangentially embedded rotor.

Figure 13:
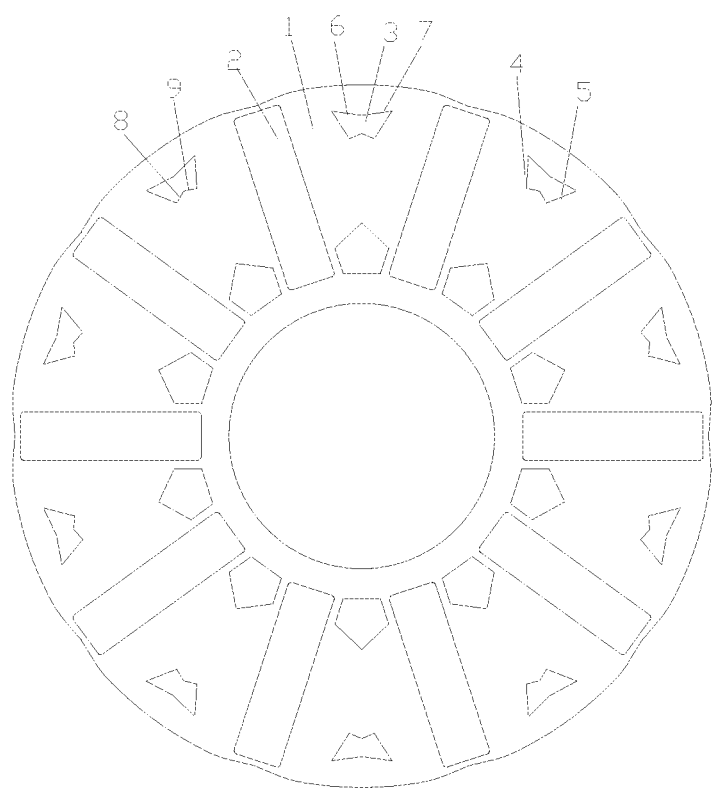
FIG. 13 illustrates a schematic structural diagram of the motor rotor according to some other embodiments of the present disclosure.
Figure 14:
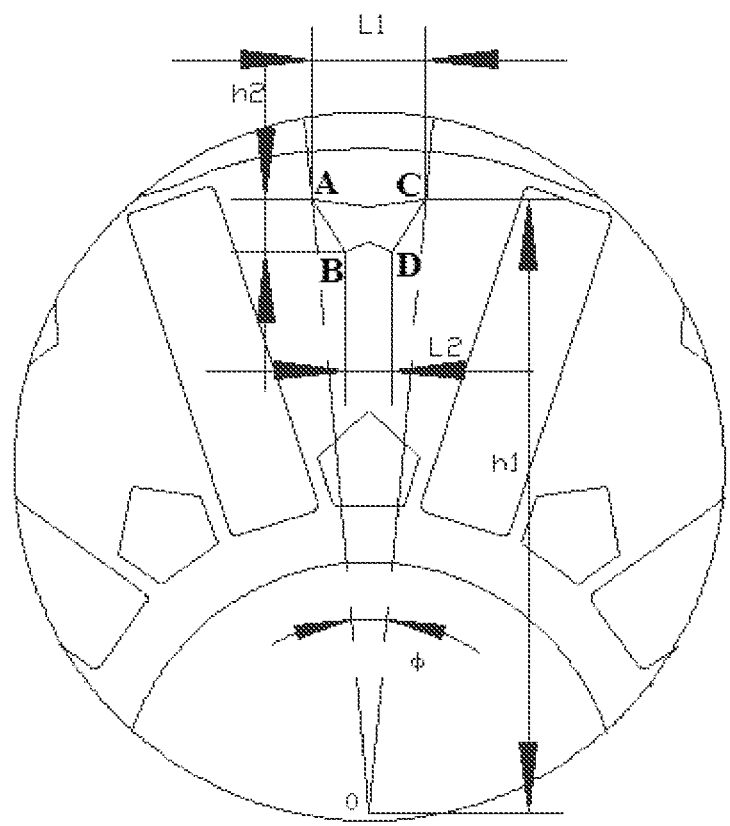
FIG. 14 is a schematic diagram showing a size of a polygonal slot according to the embodiments in FIG. 13.

Referring to FIG. 13 and FIG. 14, in some other embodiments, the first endpoint A and the third endpoint C are connected by a first polyline segment; and/or, the second endpoint B and the fourth endpoint D are connected by a second polyline segment. The first polyline segment may be formed by connecting a plurality of straight line segments, a first end of the first polyline segment is connected to the first endpoint A, and a second end of the first polyline segment is connected to the third endpoint C. The second polyline segment may be formed by connecting a plurality of straight line segments, a first end of the second polyline segment is connected to the second endpoint B, and a second end of the second polyline segment is connected to the fourth endpoint D.

In this embodiment, the polygonal slot 3 is a hexagonal slot, the first polyline segment includes a first straight line segment 6 and a second straight line segment 7, and a tip of a connection between the first straight line segment 6 and the second straight line segment 7 faces toward the center of the rotor body 1; and/or, the second polyline segment includes a third straight line segment 8 and a fourth straight line segment 9, and a tip of a connection between the third straight line segment 8 and the fourth straight line segment 9 is away from the center of the rotor body 1.

In other embodiments, the first endpoint A and the third endpoint C may be connected by the first polyline segment, and the second endpoint B and the fourth endpoint D may be connected by the straight line segment. Alternatively, the first endpoint A and the third endpoint C may be connected by the straight line segment, and the second endpoint B and the fourth endpoint D may be connected by the second polyline segment.

When the first polyline segment includes the first straight line segment 6 and the second straight line segment 7 and the second polyline segment includes the third straight line segment 8 and the fourth straight line segment 9, it may be used a structure where a tip of a connection between the first straight line segment 6 and the second straight line segment 7 faces toward the center of the rotor body 1, and a tip of a connection between the third straight line segment 8 and the fourth straight line segment 9 is away from the center of the rotor body 1. Alternatively, it may be used a structure where the tip of the connection between the first straight line segment 6 and the second straight line segment 7 as well as the tip of the connection between the third straight line segment 8 and the fourth straight line segment 9 with both facing toward the center of the rotor body 1. Alternatively, it may be used as a structure where the tip of the connection between the first straight line segment 6 and the second straight line segment 7 as well as the tip of the connection between the third straight line segment 8 and the fourth straight line segment 9 both are away from the center of the rotor body 1.

Figure 15:
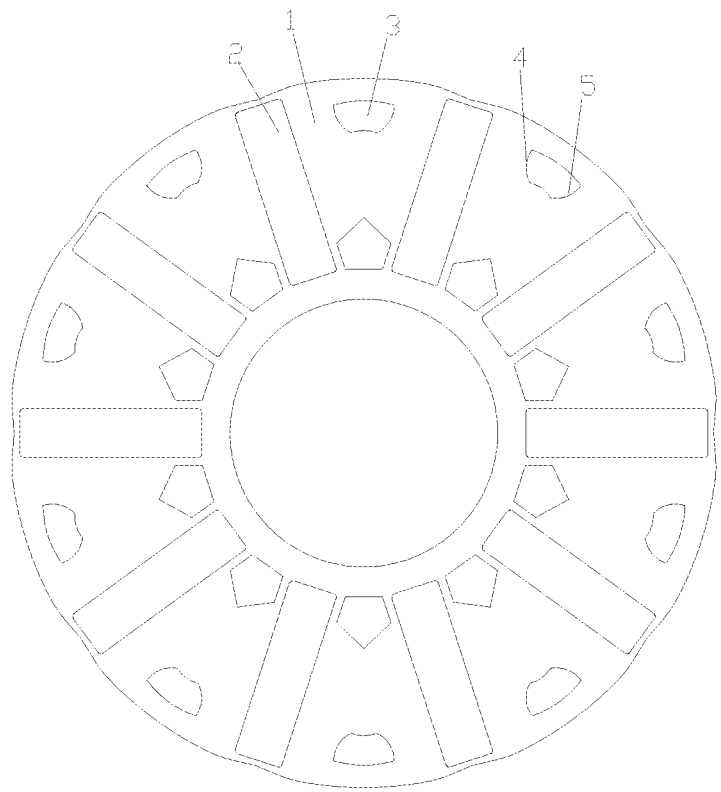
FIG. 15 illustrates a schematic structural diagram of the motor rotor according to still some other embodiments of the present disclosure.
Figure 16:
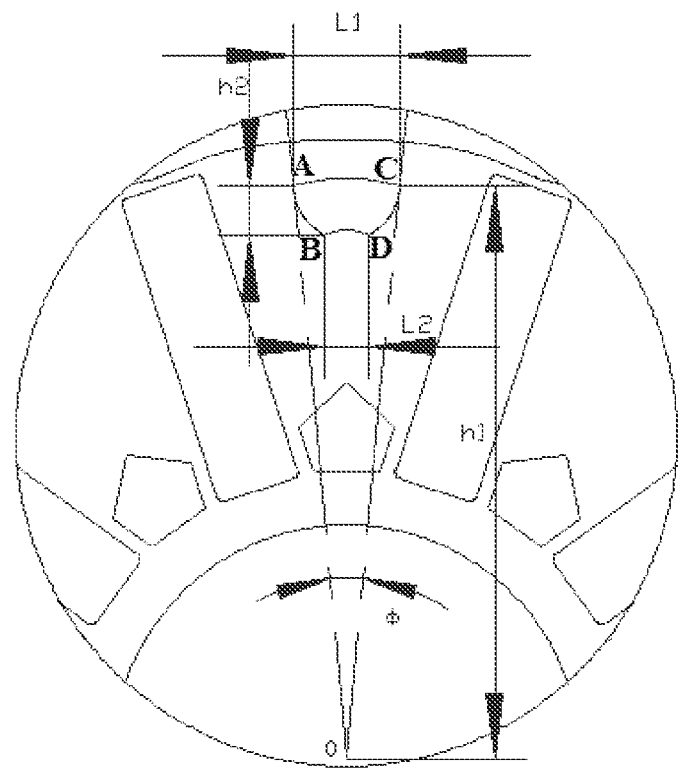
FIG. 16 is a schematic diagram showing a size of a polygonal slot according to the embodiments in FIG. 15.

Referring to FIG. 15 and FIG. 16, in some embodiments, the first slot side 4 and the second slot side 5 are arc sides. The first endpoint A and the third endpoint C may be connected by a straight line, a polyline, or an arc line. The second endpoint B and the fourth endpoint D may be connected by a straight line, a polyline, or an arc line.

In FIG. 16, the connecting line between the first endpoint A and the third endpoint C is a first arc line, the connecting line between the second endpoint B and the fourth endpoint D is a second arc line, and the first arc line and the second arc line are arranged concentrically, thereby forming a quadrilateral slot whose four sides are all arc-shaped.

Figure 17:
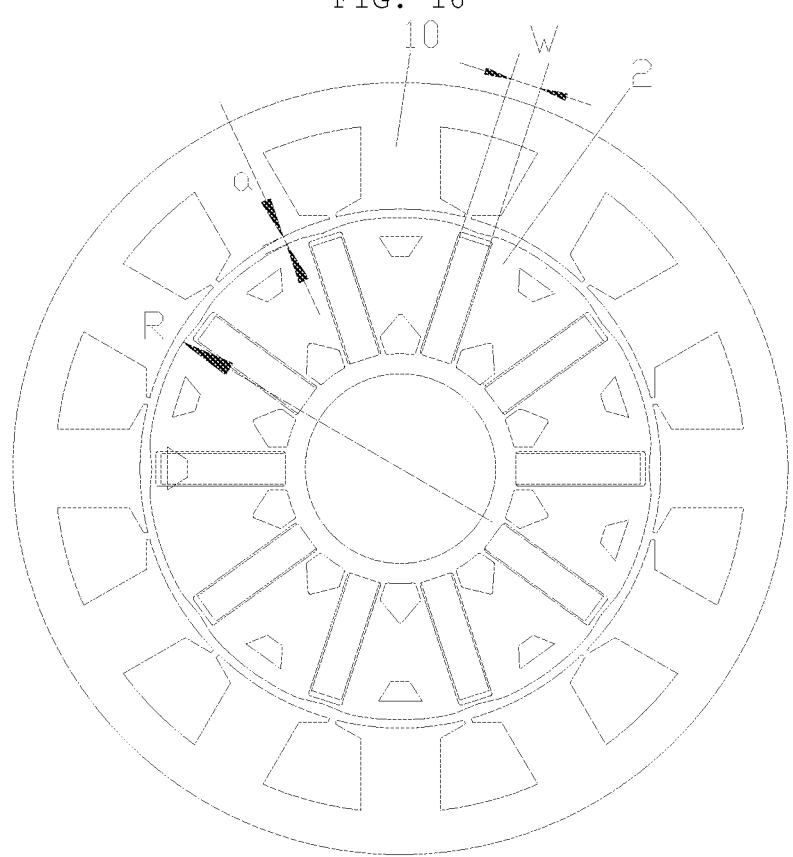
FIG. 17 illustrates a schematic structural diagram of a permanent magnet motor according to some embodiments of the present disclosure.

Referring to FIG. 17, in some embodiments, the permanent magnet motor includes a motor rotor, and this motor rotor is the motor rotor according to any embodiment of the present disclosure.

The permanent magnet motor further includes a stator assembly, the stator assembly includes a stator iron core 10, and an air gap is provided between the stator iron core 10 and the rotor body 1. The stator iron core 10 and a rotor iron core of the motor rotor are laminated by electromagnetic steel plates. The majority of the structure of the motor rotor is a main magnetic circuit, which provides, together with the stator iron core 10, a magnetic circuit for the magnetomotive force.

The pole pitch is defined in electromechanics as a length of circumference of an inner surface of a stator corresponding to a pole. When an air-gap length a≤0.4 mm and an outer diameter of the rotor D≥20 mm, a ratio of W to τ may represent an overall proportion of thickness of the magnetic steel.

In this embodiment, when the air-gap length a of the air gap is less than or equal to 0.4 mm and the outer diameter D of the rotor body 1 is greater than or equal to 20 mm, the ratio of W to τ satisfies: 0.18≤W/τ≤0.3, wherein the W represents a thickness of a permanent magnet, and the τ represents a pole pitch of the motor.

In some embodiments, the ratio of W to τ satisfies: 0.19≤W/τ≤0.23. The detent torque and the output torque of the motor may be calculated for different values of W/τ, and the calculation results are as shown in FIG. 5 and FIG. 6.

Figure 5:
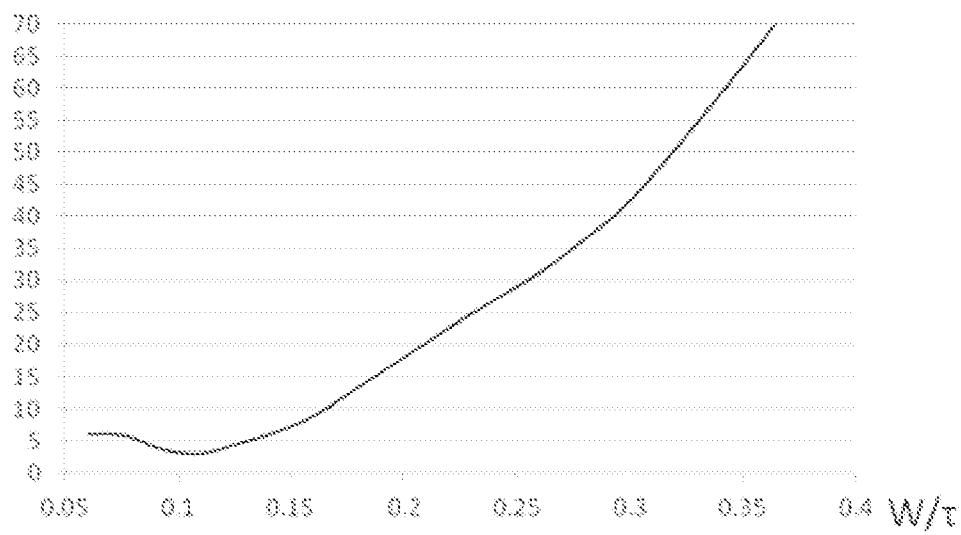
FIG. 5 illustrates a curve diagram between W/$\tau$ and a detent torque of a motor rotor.

It is concluded from FIG. 5 that the detent torque decreases first and then increases with the increase of W/τ. This is because increasing the thickness of the permanent magnet may cause the magnetic lines of force of the rotor to converge toward the magnetic pole center, which in turn affects the air-gap flux density distribution of the motor. The air-gap flux density distribution has a great effect on the detent torque of the motor, and the motor has an optimal distribution of magnetic lines of force, and the detent torque is the smallest at this moment.

Figure 6:
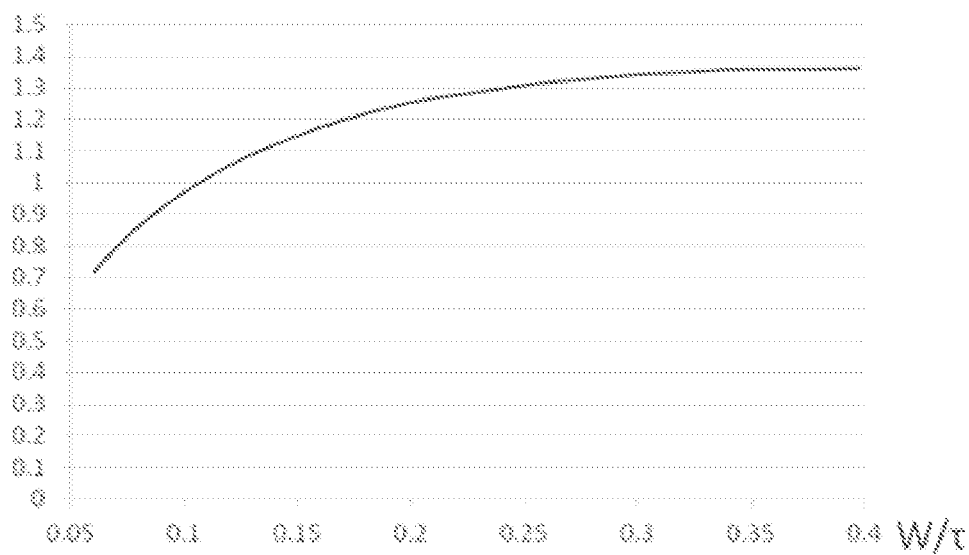
FIG. 6 illustrates a curve diagram between W/$\tau$ and an output torque of a motor rotor.

It is concluded from FIG. 6 that the output torque gradually increases with the increase of W/τ, but a growth rate gradually slows down. This is because increasing the thickness of the permanent magnet may increase a working point of the permanent magnet, but the working point basically tends to be stable after increasing to a certain value. Considering two aspects of increasing the power density of the motor and saving costs of the permanent magnet, it is more appropriate if the value of the W/τ ranges from 0.18 to 0.3. At this moment, the output torque of the motor is higher and no material is wasted.

The output torque and the detent torque of the motor are synthetically considered, the detent torque should not be too large, and it is relatively suitable when 0.19≤W/τ≤0.23. Because the thickness W of the permanent magnet is larger at this moment, the magnetic lines of force converge toward the magnetic pole center, and the detent torque is not ideal. After the polygonal slot 3 is additionally provided, the polygonal slot 3 may be employed to disperse the magnetic lines of force of the magnetic pole center, and the detent torque is optimized, such that the output torque of the motor is higher and no material is wasted, meanwhile the problem of increased detent torque of the motor caused by the larger thickness W of the permanent magnet may be avoided. In this way, the structure of the motor rotor is effectively improved, the working performance of the permanent magnet motor is increased, and the power density of the motor is increased while the detent torque of the motor is reduced.

The stator assembly further includes a stator frame arranged on the stator iron core 10, and a stator winding is concentratedly wound around the stator frame.

A three-phase voltage of the permanent magnet motor is a three-phase sine-wave voltage.

At this point, various embodiments of the present disclosure have been described in detail. Some details well known in the art are not described to avoid obscuring the concept of the present disclosure. Based on the above description, those skilled in the art can fully understand how to implement the technical solutions disclosed herein. It is readily comprehensible to those skilled in the art that the above preferred embodiments may be freely combined or superimposed on a non-conflict basis.

The embodiments described above are merely preferred embodiments of the present disclosure, and are not intended to limit the present disclosure. All modifications, equivalent substitutions and improvements made within the spirit and principles of the present disclosure shall fall within the protection scope of the present disclosure. The above embodiments merely are preferred embodiments of the present disclosure. It is to be pointed out that to those of ordinary skill in the art, various improvements and variations may be made without departing from the technical principles of the present disclosure, and these improvements and variations are also deemed to be within the scope of protection of the present disclosure.

What is claimed is:

1. A motor rotor, comprising a rotor body, which has a plurality of permanent magnet slots arranged along a circumferential direction and a polygonal slot located between two adjacent permanent magnet slots, the polygonal slot being symmetrical with respect to a magnetic pole centerline between the two adjacent permanent magnets,
   wherein the polygonal slot comprises:
   a first slot side, arranged at a first end of the polygonal slot along the circumferential direction of the rotor body, and having a first endpoint away from a center of the rotor body and a second endpoint adjacent to the center of the rotor body, in a section perpendicular to a central axis of the rotor body; and
   a second slot side, arranged at a second end of the polygonal slot along the circumferential direction of the rotor body, and having a third endpoint away from the center of the rotor body and a fourth endpoint adjacent to the center of the rotor body, in the section perpendicular to the central axis of the rotor body,
   wherein a distance from a connecting line between the first endpoint and the third endpoint to the center of the rotor body is denoted by h1, a radius of the rotor body is denoted by R, and h1 and R satisfy: 0.96≤h1/R≤0.99; a connecting line between the first endpoint and the center of the rotor body is a first connecting line, a connecting line between the third endpoint and the center of the rotor body is a second connecting line, and an included angle between the first connecting line and the second connecting line is denoted by Φ and satisfies: 3.7°≤Φ≤5.6°; and a length of a projection of the first slot side on the magnetic pole centerline is denoted by h2 and a length of the connecting line between the first endpoint and the third endpoint is denoted by L1 and h2 and L1 satisfy: 0.05≤h2/L1≤0.5.

2. The motor rotor according to claim 1, wherein a length of a connecting line between the second endpoint and the fourth endpoint is denoted by L2 and the length of the connecting line between the first endpoint and the third endpoint is denoted as L1, and L2 and L1 satisfy: 0.2≤L2/L1≤1.0.

3. The motor rotor according to claim 1, wherein along a direction away from the center of the rotor body, a spacing between the first slot side and the second slot side is increasing.

4. The motor rotor according to claim 3, wherein the first slot side and the second slot side are straight sides.

5. The motor rotor according to claim 4, wherein the polygonal slot is a trapezoidal slot, the connecting line between the first endpoint and the third endpoint is a straight line, and a connecting line between the second endpoint and the fourth endpoint is a straight line.

6. The motor rotor according to claim 4, wherein the first endpoint and the third endpoint are connected by a first polyline segment.

7. The motor rotor according to claim 6, wherein the polygonal slot is a hexagonal slot; and
the first polyline segment comprises a first straight line segment and a second straight line segment, and a tip of a connection between the first straight line segment and the second straight line segment faces toward the center of the rotor body.

8. The motor rotor according to claim 4, wherein the second endpoint and the fourth endpoint are connected by a second polyline segment.

9. The motor rotor according to claim 8, wherein the polygonal slot is a hexagonal slot; and
the second polyline segment comprises a third straight line segment and a fourth straight line segment, and a tip of a connection between the third straight line segment and the fourth straight line segment is away from the center of the rotor body.

10. The motor rotor according to claim 3, wherein the first slot side and the second slot side are arc sides.

11. The motor rotor according to claim 10, wherein the connecting line between the first endpoint and the third endpoint is a straight line, a polyline, or an arc line.

12. The motor rotor according to claim 10, wherein a connecting line between the second endpoint and the fourth endpoint is a straight line, a polyline, or an arc line.

13. A permanent magnet motor, comprising the motor rotor according to claim 1.

14. The permanent magnet motor according to claim 13, wherein the permanent magnet motor further comprises a stator assembly, the stator assembly comprises a stator iron core, and an air gap is formed between the stator iron core and the rotor body.

15. The permanent magnet motor according to claim 14, wherein when an air-gap length of the air gap is less than or equal to 0.4 mm and an outer diameter of the rotor body is greater than or equal to 20 mm, a ratio of W to $\tau$ satisfies: $0.18 \leq W/\tau \leq 0.3$, wherein W represents a thickness of a permanent magnet, and $\tau$ represents a pole pitch of the motor.

16. The permanent magnet motor according to claim 15, wherein the ratio of W to $\tau$ satisfies: $0.19 \leq W/\tau \leq 0.23$.

17. The permanent magnet motor according to claim 14, wherein the stator assembly further comprises a stator frame mounted on the stator iron core, and a stator winding is concentratedly wound around the stator frame.

18. The permanent magnet motor according to claim 13, wherein a three-phase voltage of the permanent magnet motor is a three-phase sine-wave voltage.

* * * * *

UNITED STATES PATENT AND TRADEMARK OFFICE
CERTIFICATE OF CORRECTION

PATENT NO. : 11,522,397 B2  
APPLICATION NO. : 17/053450  
DATED : December 6, 2022  
INVENTOR(S) : Na Liu et al.

Page 1 of 1

It is certified that error appears in the above-identified patent and that said Letters Patent is hereby corrected as shown below:

On the Title Page

Item (73) Column 1, Assignees, Lines 1-4, delete "Zhuhai Kaibang Motor Co., Ltd., Zhuhai (CN); Gree Electric Appliances, Inc. of Zhuhai, Guangdong (CN)" and insert -- Gree Electric Appliances, Inc. of Zhuhai, Zhuhai, Guangdong (CN); Zhuhai Kaibang Motor Co., Ltd., Zhuhai City, Guangdong (CN) --

Signed and Sealed this  
Twenty-fifth Day of June, 2024

Katherine Kelly Vidal  
*Director of the United States Patent and Trademark Office*